(12) United States Patent
Oulie et al.

(10) Patent No.: US 8,709,603 B2
(45) Date of Patent: Apr. 29, 2014

(54) ARTICLE BASED ON A COMPOSITION CONTAINING A CROSSLINKED BLEND OF ELASTOMERS

(76) Inventors: Michel Oulie, Valbeleix (FR); Herve Runarvot, Entrammes (FR)

( * ) Notice: Subject to any disclaimer, the term of this patent is extended or adjusted under 35 U.S.C. 154(b) by 99 days.

(21) Appl. No.: 12/670,508

(22) PCT Filed: Jul. 29, 2008

(86) PCT No.: PCT/EP2008/059947
§ 371 (c)(1),
(2), (4) Date: Jan. 25, 2010

(87) PCT Pub. No.: WO2009/016182
PCT Pub. Date: Feb. 5, 2009

(65) Prior Publication Data
US 2010/0194050 A1 Aug. 5, 2010

(30) Foreign Application Priority Data
Jul. 30, 2007 (FR) ...................................... 07 56788

(51) Int. Cl.
*C08L 9/00* (2006.01)
*F16L 25/00* (2006.01)
*F16J 15/16* (2006.01)

(52) U.S. Cl.
USPC ...................... 428/411.1; 525/332.3; 277/407

(58) Field of Classification Search
USPC ......................................................... 428/421
See application file for complete search history.

(56) References Cited

U.S. PATENT DOCUMENTS

| 4,421,884 A | 12/1983 | Oyama et al. |
| 5,214,102 A | 5/1993 | Zielinski et al. |
| 5,872,190 A * | 2/1999 | Gutowski et al. ........... 525/359.4 |
| 2001/0006995 A1 | 7/2001 | Obrecht et al. |
| 2004/0127647 A1 * | 7/2004 | Ong et al. ...................... 525/191 |
| 2004/0132906 A1 * | 7/2004 | Guerin et al. ..................... 525/63 |
| 2005/0113516 A1 | 5/2005 | von Hellens et al. |
| 2005/0148727 A1 | 7/2005 | Ajbani et al. |
| 2006/0119047 A1 * | 6/2006 | Riley ............................. 277/372 |
| 2007/0074785 A1 * | 4/2007 | Ganachaud .................. 141/350 |
| 2007/0222157 A1 * | 9/2007 | Kondo et al. .................. 277/345 |

FOREIGN PATENT DOCUMENTS

| EP | 1321499 A2 | 6/2003 |
| FR | 2861655 A1 | 5/2005 |
| JP | 58039436 A | 3/1983 |
| JP | 60058457 A | 4/1985 |

(Continued)

OTHER PUBLICATIONS

Ibnelwaleed A. Hussein, Rehan A. Chaudhry, Basel F. Abu Sharkh, "Study of the Miscibility and Mechanical Properties of NBR/HNBR blends". Polymer Engineering and Science (Dec. 2004), vol. 44, n° 12, pp. 2346-2352.

(Continued)

*Primary Examiner* — Callie Shosho
*Assistant Examiner* — Patrick English
(74) *Attorney, Agent, or Firm* — Oblon, Spivak, McClelland, Maier & Neustadt, L.L.P.

(57) ABSTRACT

Article based on an elastomeric composition (C) comprising a crosslinked blend (B) of at least: (1) one substantially saturated synthetic elastomer; and (2) a copolymer containing repeating units derived from at least one conjugated diene and at least one α,β-unsaturated nitrile, the article having been subjected to a surface halogenation treatment.

17 Claims, 1 Drawing Sheet

(56) References Cited

FOREIGN PATENT DOCUMENTS

| | | |
|---|---|---|
| JP | 62-179538 | 8/1987 |
| JP | 03-292336 | 12/1991 |
| JP | 6121915 A | 5/1994 |
| JP | 09-067471 | 3/1997 |
| JP | 9324078 A | 12/1997 |
| JP | 10088162 A | 4/1998 |
| JP | 2004143250 A | 5/2004 |
| JP | 2006052327 A | 2/2006 |
| SU | 597687 T | 3/1978 |
| WO | WO 0177185 A1 | 10/2001 |
| WO | WO 2005049360 A2 | 6/2005 |
| WO | WO 2005056664 A1 | 6/2006 |
| WO | WO 2006091066 A1 | 8/2006 |

OTHER PUBLICATIONS

Dariusz M. Bielinski, Ludomir Slusarski, Stanley Affrossman, Mark Hartshorne, Richard A. Pethrick. "Influence of Chemical Modification on Tribological Properties of Elastomers". Journal of Applied Polymer Science (1995), vol. 56, n° 7; pp. 853-867 (ISSN-0021-8995).

[Unknown Author] Deutsche Normen Din 53520 Standard "Test of elastomers; torsional vibration test"; Jan. 1969; in German; with attached translation in English language; 8 pg. total.

[Unknown Author] ASTM D 1646-06 "Standard Test Methods for Rubber—Viscosity, Stress Relaxation, and Pre-Vulcanization Characteristics (Mooney Viscometer)"; Jan. 10, 2007; 13 pg.

[Unknown Author] Polymer Products Department Du Pont (UK) Ltd. Research Disclosure, Jan. 10, 1988, Mason Publications, Hampshire, GB—ISSN 0374-4353 vol. 285, No. 48, p. 40 (Publisher accession No. 285048); 1 pg.

Bik J; Rzymski W M; Chrusciel J. "Modification of hydrogenated nitrile rubber with polymethylhydrosilane". Elastomery (2003) vol. 7, No. 6, p. 9-16 in Polish (ISSN-1427-3519) with attached abstract in English; 9 pg. total.

Bielinski D M; Slusarski L; Affrossman S; O'Neill S A; Pethrick R A. "Influence of Iodination on Tribological Properties of Acrylonitrile-Butadiene Rubber". Journal of Applied Polymer Science (Jun. 6, 1997), vol. 64, No. 10, p. 1927-1936 (ISSN-0021-8995).

Morgan R A; Stewart C W; Thomas E W; Stahl W M., "Reinforcement with fluoroplastic additives". Rubber World (May 1991), vol. 204, No. 2, p. 25-28 (ISSN-0035-9572).

Office Action issued May 20, 2013, in Japanese patent application No. 2010-518653 (w/English translation).

* cited by examiner

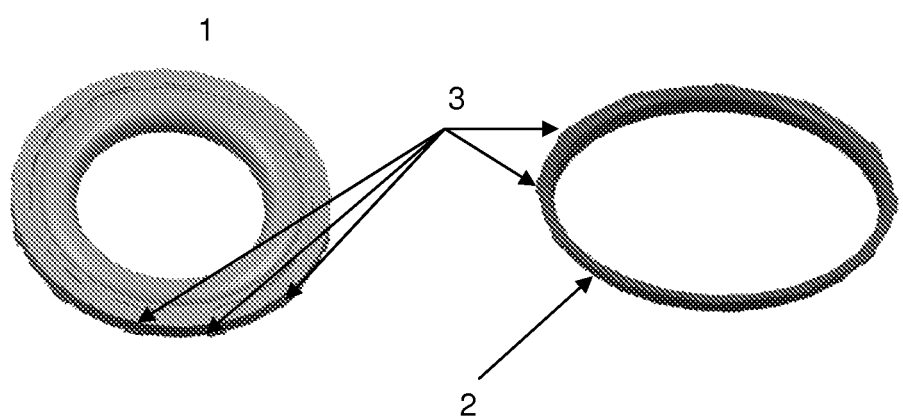

ARTICLE BASED ON A COMPOSITION CONTAINING A CROSSLINKED BLEND OF ELASTOMERS

CROSS-REFERENCE TO RELATED APPLICATIONS

This application is a U.S. national stage application under 35 U.S.C. §371 of International Application No. PCT/EP2008/059947 filed Jul. 29, 2008, which claims priority to French Patent Application No. 07/56788 filed Jul. 30, 2007, these applications being incorporated herein by reference in their entirety for all purposes.

The present invention relates to an article (and in particular, a seal) based on a composition containing a crosslinked blend of elastomers that has undergone a surface treatment. It also relates to a process for manufacturing such an article (seal).

The increasing demands of large contemporary industries, such as the automotive industry and the oil industry for example, for products having high-performance elastomeric properties, have led to the development of rubbers formed from butadiene/acrylonitrile copolymers (commonly known, more briefly, as NBR rubbers). The good resistance to oils, greases and fuels of these NBR rubbers, their low permeability, their high-temperature resistance, their resistance to chemicals in general and their good dimensional stability, make it possible to use them, in particular, for manufacturing moulded articles and parts, such as seals for example, that operate under static contact conditions.

In the case of dynamic contact conditions, NBR rubbers are not however very suitable because their friction coefficient is too high. This problem has been partially solved by subjecting the vulcanizates of NBR rubbers to surface halogenation or sulphonation treatments which improve their tribological properties. These halogenation or sulphonation treatments have been described, for example, by D. M. Bielinski et al. in Journal of Applied Polymer Science, Vol. 56, pages 853-867 (1995).

Despite these treatments, which reduce their friction coefficient, the use of NBR rubbers for manufacturing moulded articles that operate under dynamic contact conditions is not entirely satisfactory due to their inadequate tear strength and abrasion resistance.

In order to try to solve the latter problem, it has been suggested to use other synthetic elastomers that are resistant to oils, greases and fuels, more particularly hydrogenated butadiene/acrylonitrile copolymers (commonly known, more briefly, as HNBR rubbers), which have the same advantageous properties as the NBR rubbers but for which the tear strength, abrasion resistance and compressive strength are manifestly greater than those of NBR rubbers. However, the synthetic elastomers used—in particular the HNBR rubbers, which are very expensive—have a predominantly saturated structure, that is to say that they are substantially free of units of diene origin (substantial absence of conjugated or unconjugated carbon-carbon double bonds). This saturated structure prevents the application, to the surface of these elastomers, of the halogenation or sulphonation treatments that are applied to the NBR rubbers to reduce the friction coefficient thereof.

BRIEF DESCRIPTION OF DRAWINGS

FIG. 1 illustrates a seal overmolded on a metal substrate equipped with claws

The present invention aims to solve these problems by providing an article based on an elastomeric composition, all the properties of which, especially the low friction coefficient and the good tear strength and abrasion resistance, make it particularly suitable for operating under dynamic contact conditions.

The present invention therefore mainly relates to an article based on an elastomeric composition (C) comprising a crosslinked blend (B) of at least:

(1) one substantially saturated synthetic elastomer; and
(2) a copolymer containing repeating units derived from at least one conjugated diene and at least one α,β-unsaturated nitrile, said article having been subjected to a surface halogenation treatment.

In the present description, the term "elastomer" (and by extension the qualifier "elastomeric") conventionally and commonly denotes any organic polymer capable of elastic collisions which enable it to return to its initial shape after being stretched, with practically no plastic deformation. In general, it is a polymer for which the glass transition temperature (or $T_g$), measured according to the DIN 53520 standard, is below 0° C.

In the present description, the expression "crosslinked blend" is understood to mean a polymer structure, the macromolecules of which intersect (crosslink) via covalent bonds generated by a conventional vulcanization (curing) treatment (described later on), which retains its elastomeric nature and prevents its permanent deformation.

At least one of the constituents of the crosslinked blend (B) included in the elastomeric composition (C) is a substantially saturated synthetic elastomer (1). In the present description, the expression "substantially saturated synthetic elastomer" is understood to mean any polymer material of synthetic origin that has elastomeric properties and that is substantially free of diene unsaturations (conjugated or unconjugated carbon-carbon double bonds). The expression "substantially free of" is understood to mean that the synthetic elastomer (1) contains less than 15 mol % of diene units, preferably less than 5 mol % of these units, most particularly less than 2 mol % of these units. The synthetic elastomer (1) may be completely free of diene units.

As examples of substantially saturated synthetic elastomers which may be present in the elastomeric composition (C), mention may be made of:

(a) copolymers derived from ethylene and propylene (commonly known, more briefly, as EPM rubbers) and terpolymers derived from ethylene, propylene and a diene (commonly known, more briefly, as EPDM rubbers); the weight percentages of ethylene and propylene in these copolymers are generally between 80% and 20% (ethylene) and between 20% and 80% (propylene) respectively; the diene present in the terpolymers is generally an unconjugated diene, such as norbornene and dicyclopentadiene; the weight percentage of diene in the terpolymers is generally between 2% and 11%;

(b) elastomers derived from epichlorohydrin; these elastomers may be epichlorohydrin homopolymers, epichlorohydrin/ethylene oxide copolymers and epichlorohydrin/ethylene oxide/allyl glycidyl ether terpolymers;

(c) copolymers, containing repeat units derived from at least one conjugated diene and at least one α,β-unsaturated nitrile, that have undergone a hydrogenation treatment; these hydrogenated copolymers (c) may optionally contain other unsaturated monomers, which are copolymerizable with the conjugated diene and the α,β-unsaturated nitrile; the copolymers (c) that have a random sequence of their various repeat units are preferred.

Among these substantially saturated synthetic elastomers, the elastomers (b) and copolymers (c) are preferred, especially for their high resistance to oils and greases. The hydrogenated copolymers (c) are particularly preferred, especially considering their other advantageous mechanical properties.

In the present description, the expression "hydrogenated copolymers (c)" applies not only to the copolymers derived from a conjugated diene and α,β-unsaturated nitrile alone (HNBR) but also to the copolymers that optionally contain repeat units derived from unsaturated monomers that have a carboxyl group (commonly known, more briefly, as "HXNBR rubbers" and that are described in particular in document WO 2001/077185); as monomers that have a carboxyl group, mention may be made of acrylic, methacrylic, fumaric and maleic acids, and esters thereof.

Preferably, the conjugated dienes from which the hydrogenated copolymers (c) are derived that can be used according to the invention are chosen from butadiene, isoprene, piperylene, 2,3-dimethylbutadiene and mixtures thereof. One particularly preferred conjugated diene is butadiene.

Preferably, α,β-unsaturated nitriles from which the hydrogenated copolymers (c) are derived that can be used according to the invention are chosen from acrylonitrile, methacrylonitrile, ethacrylonitrile and mixtures thereof. One particularly preferred α,β-unsaturated nitrile is acrylonitrile.

The conjugated diene content of the hydrogenated copolymers (c) that can be used according to the invention is generally greater than 30 wt %, preferably greater than 40 wt %, most particularly greater than 50 wt %. This content is moreover generally less than 85 wt %, preferably less than 75 wt %, most particularly less than 70 wt %.

The α,β-unsaturated nitrile content of the hydrogenated copolymers (c) that can be used according to the invention is generally greater than 15 wt %, preferably greater than 25 wt %, most particularly greater than 30 wt %. This content is only limited by the ability of the hydrogenated copolymer (c) to retain its elastomeric characteristics, such as extensibility and retractibility. Under this proviso, it is generally less than 70 wt %, preferably less than 60 wt %, most particularly less than 50 wt %.

When the hydrogenated copolymer (c) that can be used according to the invention contains repeat units derived from unsaturated monomers that have a carboxyl group, the content of these monomers is generally between 0.5 and 10 wt %, preferably between 1 and 7 wt %.

Hydrogenation of the copolymers (c) may take place, in a known manner, starting from their non-hydrogenated homologues, in particular by homogeneous or heterogeneous catalytic hydrogenation of the latter. This hydrogenation, which may be partial or complete, is described, for example, in the abovementioned document WO 2001/077185. It is understood that this hydrogenation must be carried out so as to obtain a hydrogenated copolymer (c) corresponding to the substantially saturated configuration defined for the synthetic elastomer (1) included in the composition (C). Thus, this hydrogenation is carried out in such a way that the content of diene unsaturations (carbon-carbon double bonds) of the hydrogenated copolymer (c) is generally less than 150 per thousand carbons, preferably less than 50 per thousand carbons, more particularly less than 20 per thousand carbons. Excellent results have been obtained with hydrogenated copolymers (c) for which the content of diene unsaturations is between 0.2 and 10 per thousand carbons.

The hydrogenated copolymers (c) that can be used according to the invention have a Mooney viscosity (standard ASTM D 1646) in general between around 25 and around 125 $ML_{1+4}$ at 100° C., and preferably between around 45 and around 100 $ML_{1+4}$ at 100° C.

The crosslinked blend (B) included in the elastomeric composition (C) contains at least one other constituent which is a copolymer (2) containing repeating units derived from at least one conjugated diene and from at least one α,β-unsaturated nitrile. All the definitions and limitations mentioned above in relation to the constituent monomers of the hydrogenated copolymer (c), their nature and their contents in this copolymer are applicable, mutatis mutandis, to the copolymer (2), it being understood that the latter is not hydrogenated and therefore has a substantially unsaturated structure, that is to say containing more than 85 mol % of diene units, preferably more than 95 mol % of these units, most particularly more than 98 mol % of these units.

The copolymer (2) may have a completely unsaturated structure. In order to produce the elastomeric composition (C), the synthetic elastomer (1) and the copolymer (2) are blended together in [synthetic elastomer (1)]/[copolymer (2)] weight ratios generally between 90/10 and 10/90, preferably between 75/25 and 25/75. Very good results have been recorded with elastomeric compositions in which the synthetic elastomer (1) and the copolymer (2) have been blended together in [synthetic elastomer (1)]/[copolymer (2)] weight ratios between 70/30 and 30/70. After the halogenation treatment (described later on) to which the crosslinked blend (B) according to the invention is subjected, an elastomeric composition (C) richer in synthetic elastomer (1) is generally more resistant to abrasion and has a higher tear strength; an elastomeric composition (C) richer in copolymer (2) generally has a lower friction coefficient.

Besides the crosslinked blend (B), the elastomeric composition (C) according to the invention may contain other conventional additives that are well known in the rubber industry. As non-limiting examples of such additives, mention may be made of:

fillers and mixtures of fillers, such as silica and silicates; glass fibres; metal oxides, carbonates and hydroxides; carbon blacks, etc.;
pigments and dyes;
plasticizers;
stabilizers and antioxidants;
fire retardants and flame retardants;
anti-blocking agents;
antistatic agents;
processing aids;
moulding agents;
compatibilizers;
reinforcing agents;
lubricants;
thickeners;
etc.

These various additives may be incorporated into the elastomeric composition (C) in conventional amounts, generally between 0.1 and 50 wt %, depending, in particular, on the nature of the additive and the use for which said composition is intended.

To obtain the crosslinked blend (B), vulcanization of the uncrosslinked blend of the synthetic elastomer (1) and the copolymer (2) is carried out, as for any thermosetting elastomer from the prior art. This vulcanization may take place using vulcanization systems known in the art, such as vulcanization systems containing sulphur (SV) or vulcanization systems containing a peroxide (PV). The choice of the vulcanization system depends, in a manner known to a person skilled in the art, on the nature of the synthetic elastomer (1) and the copolymer (2).

The (SV) vulcanization systems in general comprise sulphur or a sulphur-donor compound as a vulcanizing agent and, preferably, an accelerator and also vulcanization activators, such as zinc oxide and stearic acid. The amount of sulphur (and/or of sulphur equivalent supplied by a sulphur-donor compound) to be incorporated into the blend (B) is generally between 0.1 and 25 wt % of this blend, preferably between 0.2 and 8 wt % of this blend. When the (SV) vulcanization system comprises, in a known manner, an accelerator, this may be derivatives of benzothiazole, of sulphenamide or of sulphenimide, for example. The accelerator and the activator may be present in the (SV) vulcanization system in an amount of 0.2 to 8 parts by weight, preferably in an amount of 1 to 6 parts by weight per part by weight of sulphur.

The (PV) vulcanization systems in general comprise an organic peroxide and preferably a co-accelerator. Although all organic peroxides are suitable, generally alkyl peroxides, aryl peroxides and mixtures thereof are preferred. Among these, mention may be made of: benzoyl peroxide, dichlorobenzoyl peroxide, dicumyl peroxide, di(t-butyl) peroxide, t-butylcumyl peroxide, 1,3-di(2-t-butylperoxyisopropyl)benzene, 2,5-dimethyl-2,5-di(t-butylperoxy)hexane and 2,5-dimethyl-2,5-di(t-butylperoxy)-3-hexyne. The amount of peroxide to be incorporated into the blend (B) is generally between 0.1 and 10 wt % of this blend, preferably between 0.2 and 5 wt % of this blend. When the (PV) vulcanization system comprises, in a known manner, a co-accelerator, this may be triallyl isocyanurate, N,N'-(m-phenylene)dimaleimide or trimethylolpropane trimethacrylate, for example.

According to the invention, the article based on the elastomeric composition (C) is subjected to a surface halogenation treatment. This halogenation treatment may be a fluorination, chlorination, bromination or iodination treatment, but it is preferably a chlorination or bromination treatment, most particularly a bromination treatment. This halogenation treatment is preferably carried out so as to only modify the surface properties of said blend, without adversely affecting the elastic properties thereof. The term "surface" is understood to mean, in the present description, a three-dimensional surface layer, the thickness of which is between a few microns and a few tens of microns, or even ten or so microns.

Without the scope of the invention in any way being limited to any one theory as regards the mechanism of the surface halogenation treatment, the Applicant thinks that there is, at least in part, a surface chemical interaction (valence bonds) between the halogen atoms and the diene unsaturations present in the blend (B). Whatever it may be, the results of this halogenation treatment on the elastomeric composition (C) are an increase in its surface energy and a reduction in its friction coefficient.

This surface halogenation treatment is generally carried out using a halogenating agent which may be a halogen or any organic or inorganic halogenated compound capable of releasing the halogen under industrially acceptable temperature and concentration conditions. In the case of a halogen as a halogenating agent, it is preferred to use chlorine and bromine, more particularly bromine, in the liquid state, in the gaseous state or dissolved in an organic liquid or in water. The use of chlorine also gives good results and is more environmental friendly. In the case of a halogenated compound as a halogenating agent, it is preferred to use metal halides, preferably alkali metal chlorides and bromides, in particular alkali metal bromides, especially for their high solubility in water. Examples of alkali metal chlorides and bromides that are particularly suitable are sodium and potassium chlorides and bromides and sodium hypochlorite. The halogenation treatment is generally carried out by leaving the article in a medium containing the halogenating agent. The operating conditions for this period are chosen so as to induce the modifications of the surface properties mentioned above. Some routine tests may be necessary in order to determine these conditions. In general, the medium, being in the liquid, gas or vapour state, is brought to a temperature between 0 and 120° C., preferably between 20 and 60° C. for a duration which may vary from 1 to 60 minutes, preferably from 5 to 30 minutes.

According to another aspect, the invention also relates to a process for manufacturing an article as described above. This process comprises:

a step (I), during which are blended together at least:
        a) one substantially saturated synthetic elastomer; and
        b) a copolymer containing repeat units derived from at least one conjugated diene and at least one α,β-unsaturated nitrile;
    a step (II) during which the blend obtained is subjected to a vulcanization;
    a step (III) during which the vulcanized blend is shaped; and
    a step (IV) during which the article obtained in step (III) is subjected to a surface halogenation treatment.

Step (I) of this process may be carried out according to any known method that ensures intimate mixing of the synthetic elastomer (1), of the copolymer (2) and also the optional other conventional additives described above. Thus, these ingredients may be first dry-blended, in the required proportions, in any device suitable for this purpose such as a drum mixer. The blend intended to be melted can also be produced by the masterbatch technique. The blend thus obtained is then melted either in batch mode, in batch devices such as conventional mixers, for example Banbury, Haake or Brabender mixers, or in continuous devices, such as extruders. The term "extruder" is understood to mean any continuous device comprising at least one feed zone and, at its outlet, a discharge zone preceded by a compression zone, the latter forcing the molten mass to pass through the discharge zone. The discharge zone may additionally be followed by a granulating device or by a device that gives the extruded material its final shape. Advantageously, use is made of known extruders based on the work of a single screw or of two screws which, in the latter case, may cooperate in a co-rotating or counter-rotating manner (same direction of rotation or opposite directions of rotation).

Preferably, the extruder used according to the present invention is arranged so that it successively comprises at least one feed zone, one zone for melting the material, one homogenization zone, optionally one zone for introducing additives, possibly one vulcanization zone and one compression-discharge zone preceded by one degassing zone. Each of these zones has a very specific function and is at a very specific temperature.

Generally, step (I) of the process according to the invention is carried out at a temperature between 25 and 200° C. and for a duration that does not usually exceed one hour, preferably between 2 and 30 minutes.

Steps (I) and (II) of the process may be carried out sequentially or simultaneously. When steps (I) and (II) of the process for manufacturing the elastomeric composition (C) are carried out sequentially, use is generally made, for bringing the blend formed in step (I) into contact with the vulcanization system described above, of batch devices or, preferably, continuous devices such as those described for the implementation of step (I). Preferably, steps (I) and (II) are carried out simultaneously in a common batch or, preferably, continuous device, making sure in that case to avoid any premature crosslinking of the constituents (1) and (2) of the blend formed in step (I). In this context, continuous devices consisting of counter-rotating twin-screw extruders are preferred, since their mixing elements are sufficiently modular to ensure simultaneous mixing and dynamic vulcanization.

Generally, step (III) of the process according to the invention consisting of shaping the article may be carried out sequentially or simultaneously with steps (I) and (II). Generally, shaping takes place via moulding. Any method of moulding is suitable for shaping the composition (C). It is preferred to shape the elastomeric composition (C) by compression moulding, by injection moulding or by extrusion moulding. Extrusion moulding is particularly suitable when it is precisely in one extruder that the elastomeric composition (C) has been manufactured. Injection moulding or compression moulding are particularly suitable in the case of seals, and in particular injection moulding when these are overmoulded (see later on).

Examples of articles moulded according to the invention are cables, tubing and devices for sealing pipes in the aeronautics industry, in the oil industry, in the automotive industry and in the marine industry, the interior coatings of tanks, especially tanks for oil products, windscreen-wiper blades, portholes in the marine and aeronautics industries, adhesive and sealing compounds, and also all types of seals, especially ones in contact with media containing hydrocarbons. These may be static seals, such as rings, closure members and sealing gaskets, and especially dynamic seals, in particular having excellent mechanical properties (tear strength, abrasion resistance and compressive strength) and low friction coefficients, such as seals for pumps, for bearings, for drive shafts, for stators, etc.

The present invention relates to the use of such a (dynamic) seal to provide sealing between a fill pipe head of a fuel tank and said pipe. Specifically, in certain head/pipe systems, the head comprises a sealing device that comprises a moveable part which may come into contact with (rub against) the seal when it moves. Application WO 2005/049360 in the name of the Applicant (the content of which is incorporated by reference in the present application) describes such a system to which the present invention applies particularly well.

In this system, the pipe head comprises a valve comprising a valve body that is connected to the pipe and a slide valve that can be moved in the valve body between a closed position and an open position of the valve, these components having the following characteristics:
- the body of the valve comprises an inlet opening sealed by a flap that can be moved between an open position and a closed position and an outlet opening; and
- the flap is connected to the slide valve by a coupling member so that a pressure exerted on the flap by a tubular end of a nozzle for introducing liquid into the tank causes the flap to swing in the valve casing and the slide valve to rotate, positioning a cylindrical opening of said slide valve in alignment with the inlet and outlet openings of the valve body.

Generally, the seal that provides sealing between a pipe and its head is subjected to significant stresses which may lead to an untimely deformation. Hence, in one advantageous variant, the seal is overmoulded onto a metal insert (ring, preferably) that makes it possible to ensure the stability of its shape, even in the long term.

Moreover, such a seal is generally inserted into a housing integrated into the head and/or pipe where it is preferably held/attached by force. Conventionally, this attachment is ensured by a specific part, generally a metal part also. Hence, according to one particularly advantageous variant of the invention, the aforementioned metal insert (ring) is equipped with relief(s) for anchoring the seal into its housing.

Most particularly preferably, the material which forms this housing (i.e. generally the constituent material of the head and/or of the pipe) is a plastic so that claws which sink thereinto are particularly suitable.

One metal that is particularly suitable within the context of this variant of the invention is steel and preferably a stainless or galvanized grade with a view to withstanding the outside environment (especially saline fogs, a corrosive medium to which vehicles may be subjected). As regards the plastic, it may be a polyolefin, and in particular a polyethylene (and more particularly HDPE or high-density polyethylene), which may or may not be surface-treated to reduce the permeability thereof to hydrocarbons. In the case where very high demands are imposed as regards the impermeability to hydrocarbons, a material such as polyacetal and in particular POM (polyoxymethylene) is preferred.

It should be noted that the variant described above (according to which a seal overmoulds an insert equipped with anchoring reliefs and, in particular, a metal ring equipped with claws) is also advantageous outside the context of the invention, regardless of the nature of the seal.

The present invention is illustrated non-limitingly by the following examples and by the appended FIG. 1 which illustrates a seal according to one advantageous variant of the invention.

EXAMPLE 1

A composition (C) was manufactured from constituents, the nature and the respective amounts (parts by weight) of which are listed below:

| | |
|---|---|
| Hydrogenated acrylonitrile/butadiene copolymer (HNBR) sold under the name ZETPOL ® 1010 by Zeon Chemicals (44% ACN) | 70 |
| Acrylonitrile/butadiene copolymer (NBR) sold under the name KRYNAC ® 44.50 by Lanxess (43.5% ACN) | 30 |
| Carbon black N772 (by Cabot) | 50 |
| Dioctyl phthalate plasticizer | 15 |
| Zinc oxide | 5 |
| Stearic acid | 2 |
| Sulphur | 2 |
| Tetraethylthiuram disulphide | 3 |
| Mercaptobenzothiazole disulphide | 3 |

The HNBR and NBR copolymers were blended in an internal mixer, then the other ingredients were incorporated in the usual manner. The final blend was then crosslinked in an extruder in the presence of the vulcanization system formed from the last three ingredients mentioned, and then subjected to compression moulding or injection moulding at 175° C. to obtain moulded articles in the form of seals.

These articles were then subjected to the surface bromination treatment according to the following procedure:

A liquid bromination bath having a volume of 1 liter was made up by dissolving 2 g of NaBr in 20 g of water, then by adding 2 g of pure bromine until completely dissolved, then 0.5 ml of hydrochloric acid. It was made up to 1 liter with water. The moulded articles were immersed in the treatment bath for 5 to 15 minutes depending on the desired degree of slipperiness.

Next the drained articles were immersed in a neutralizing bath made up of a 1 g/l solution of sodium hydroxide for 30 seconds, then the articles were rinsed with clean water until all traces of sodium hydroxide had disappeared, and left to dry.

The surface bromine content of the moulded articles (measured by scanning electron microscopy (SEM) at 20 kV) was between 18 and 30% depending on the treatment time.

The friction coefficient (measured relative to glass, by measuring the tensile force needed to displace a sled of the material to be measured, the surface area and the load of which are known, resting on a horizontal glass surface) of these seals was of the order of 0.3 to 0.4 and their surface energy (expressed via the surface tension obtained by measuring the contact angle with a goniometer) was 70 mN/m. This high surface tension is favourable to an optional adhesion of coatings (adhesives and inks, for example).

EXAMPLE 2R

This example is given by way of comparison.

Example 1 was reproduced except that the bromination treatment was not carried out on the moulded articles. Their friction coefficient was of the order of 2.5 to 3 and their surface energy was 50 mN/m only.

EXAMPLE 3R

This example is also given by way of comparison.

Example 1 was reproduced except that the composition (C) only contained the HNBR copolymer. When it was attempted to carry out the bromination treatment on the moulded articles, the surface bromine content of the moulded articles was less than 1% and their friction coefficient was of the order of 2 to 2.5 only.

EXAMPLE 4

Example 1 was reproduced except that the surface bromination treatment was replaced by a chlorination treatment according to the following procedure:

A liquid chlorination bath having a volume of 1 liter was made up by pouring 5 ml of sodium hypochlorite containing 40° chlorine (approximately 14%) into 1 liter of water with stirring, then by adding, with stirring, 2.5 ml of hydrochloric acid. It was made up to 1 liter with water. The moulded articles were immersed in the treatment bath for 5 to 15 minutes depending on the desired degree of slipperiness.

Next the drained articles were immersed in a neutralizing bath made up of a 1 g/l solution of sodium hydroxide for 30 seconds, then the articles were rinsed with clean water until all traces of sodium hydroxide had disappeared, and left to dry.

The surface chlorine content of the moulded articles (measured by scanning electron microscopy (SEM) at 20 kV) was between 10 and 15% depending on the treatment time. The friction coefficient obtained was of the order of 0.3 to 0.4.

EXAMPLE 5

Example 1 was reproduced except that the liquid-phase surface bromination treatment was replaced by a vapour-phase bromination treatment according to the following procedure:

2 g of bromine were introduced into a sealed 2-liter container, then heated at 60° C. The bromine passed into the vapour phase and diffused in the container and was homogenized by the convection currents. The parts were then immersed in the vapour for 5 seconds and withdrawn, in order to be neutralized for 5 seconds in a solution of water containing 1 g/l of sodium thiosulphate. The moulded articles were withdrawn, rinsed and dried.

The surface bromine content of the moulded articles was between 18 and 30% and the friction coefficient was of the order of 0.3 to 0.4.

EXAMPLE 6

Example 1 was reproduced except that 40 parts by weight of HNBR copolymer and 60 parts by weight of NBR copolymer were used to manufacture the composition (C), the nature and the respective amounts (parts by weight) of the other constituents remaining the same.

The properties measured on the moulded articles subjected to the surface bromination treatment of Example 1 were comparable to the properties measured on the articles treated according to this Example 1.

FIG. 1 illustrates a seal (1) overmoulded on a metal insert (2) equipped with claws (3) (and which is illustrated "bare"— without the seal—in the right-hand view).

Such a seal was manufactured as described in Examples 1 and 4 to 6 above. It has been successfully tested for providing sealing between a device according to the aforementioned Application WO 2005/049360 (inserted into a housing located in the lower part of said device) and a fill pipe of a fuel tank.

The invention claimed is:

1. An overmoulded dynamic seal that is overmoulded onto an insert obtained from an elastomeric composition (C) comprising a crosslinked blend (B) of at least:
    (1) one substantially saturated synthetic elastomer; and
    (2) a copolymer containing repeating units derived from at least one conjugated diene and at least one α,β-unsaturated nitrile,
    said seal having been subjected to a surface halogenation treatment,
    wherein the insert is composed of a material different from that of the seal and the insert material provides stability to the shape of the seal; wherein the seal is in contact with a media containing hydrocarbons and is located between a fill pipe head of a fuel tank and a pipe or is inserted into a housing integrated into the head and/or pipe.

2. The seal according to claim 1, wherein the substantially saturated synthetic elastomer (1) is a copolymer, containing repeating units derived from at least one conjugated diene and at least one α,β-unsaturated nitrile, that has undergone a hydrogenation treatment.

3. The seal according to claim 2, wherein the conjugated diene is butadiene.

4. The seal according to claim 1, wherein the α,β-unsaturated nitrile is acrylonitrile.

5. The seal according to claim 1, wherein the copolymer (2) is a non-hydrogenated butadiene/acrylonitrile copolymer.

6. The seal according claim 1, wherein the blend (B) contains the synthetic elastomer (1) in an amount between 70 wt % and 90 wt %, based on 100 wt % of the blend (B).

7. The seal according to claim 1, wherein the blend (B) is crosslinked using a vulcanization system selected from the group consisting of a vulcanization system containing sulphur and a vulcanization system containing a peroxide.

8. The seal according to claim 1, wherein the surface halogenation treatment is a bromination treatment.

9. The seal according to claim 1, wherein the surface halogenation treatment is a chlorination treatment.

10. A process for manufacturing the seal according to claim 1, comprising:

blending together at least (1) one substantially saturated synthetic elastomer, and (2) a copolymer containing repeat units derived from at least one conjugated diene and at least one α,β-unsaturated nitrile, thereby obtaining a blend;

subjecting the blend to a vulcanization, thereby obtaining a vulcanized blend;

overmoulding the vulcanized blend onto an insert, thereby obtaining the overmoulded dynamic seal that is overmoulded onto an insert; and subjecting the overmoulded dynamic seal that is overmoulded onto an insert to a surface halogenation treatment.

11. A method for providing sealing between a pipe and a pipe head comprising applying the seal according to claim 1 between a fill pipe head of a fuel tank and said pipe.

12. The method according to claim 11, wherein the pipe head comprises a valve comprising a valve body that is connected to the pipe, and a slide valve that is able to be moved in the valve body between a closed position and an open position of the valve, and wherein:

the body of the valve comprises an inlet opening sealed by a flap that is able to be moved between an open position and a closed position and an outlet opening; and the flap is connected to the slide valve by a coupling member so that a pressure exerted on the flap by a tubular end of a nozzle for introducing liquid into the tank causes the flap to swing in the valve casing and the slide valve to rotate, positioning a cylindrical opening of said slide valve in alignment with the inlet and outlet openings of the valve body.

13. The seal according to claim 1, wherein the blend (B) contains the synthetic elastomer (1) in an amount between 75 wt % and 90 wt %, based on 100 wt % of the blend (B).

14. The seal according to claim 1, wherein the substantially saturated synthetic elastomer (1) contains less than 15 mol % of diene units.

15. The seal according to claim 1, wherein the substantially saturated synthetic elastomer (1) contains no diene units.

16. The seal according to claim 1, wherein the insert is a metal ring.

17. The seal according to claim 16, wherein the metal ring comprises one or more reliefs for anchoring the seal into a housing provided on a pipe head and/or on a pipe.

* * * * *